(12) United States Patent
Harrison et al.

(10) Patent No.: US 7,966,510 B2
(45) Date of Patent: Jun. 21, 2011

(54) DYNAMIC FREQUENCY ADJUSTMENT FOR INTEROPERABILITY OF DIFFERENTIAL CLOCK RECOVERY METHODS

(75) Inventors: Steven Anthony Bernard Harrison, Nepean (CA); James Michael Schriel, Kanata (CA)

(73) Assignee: Alcatel Lucent, Paris (FR)

( * ) Notice: Subject to any disclaimer, the term of this patent is extended or adjusted under 35 U.S.C. 154(b) by 814 days.

(21) Appl. No.: 11/987,457

(22) Filed: Nov. 30, 2007

(65) Prior Publication Data
US 2009/0142062 A1 Jun. 4, 2009

(51) Int. Cl.
*G06F 1/00* (2006.01)
*H03B 19/00* (2006.01)
*H04J 3/06* (2006.01)
(52) U.S. Cl. .................. 713/500; 327/119; 370/503
(58) Field of Classification Search .............. 713/500
See application file for complete search history.

(56) References Cited

U.S. PATENT DOCUMENTS

| 6,380,774 | B2 * | 4/2002 | Saeki ............................ 327/119 |
| 6,522,207 | B1 * | 2/2003 | Boerstler et al. ................ 331/25 |
| 6,762,629 | B2 * | 7/2004 | Tam et al. ..................... 327/114 |
| 6,798,790 | B1 * | 9/2004 | Enssle et al. .................. 370/503 |
| 6,836,169 | B2 * | 12/2004 | Richmond et al. ............ 327/291 |
| 7,599,458 | B2 * | 10/2009 | Naffziger et al. ............. 375/371 |

* cited by examiner

*Primary Examiner* — Suresh K Suryawanshi
(74) *Attorney, Agent, or Firm* — Kramer & Amado, P.C.

(57) ABSTRACT

A system and method for dynamic frequency adjustment for interoperability of differential clock recovery, comprising: a frequency generator for receiving a frequency reference clock signal and generating a plurality of frequency signals, the plurality of frequency signals being output from the frequency generator and each having a different frequency; a flexible distributor for receiving the plurality of frequency signals from the frequency generator, and transmitting selected frequency signals; and a plurality of differential units, each for receiving the selected frequency signals, applying a differential signal to the selected frequency signals, adding time stamps to the selected frequency signals, and outputting respective time stamped differential selected frequency signals.

22 Claims, 3 Drawing Sheets

DYNAMIC FREQUENCY ADJUSTMENT FOR INTEROPERABILITY OF DIFFERENTIAL CLOCK RECOVERY METHODS

BACKGROUND OF THE INVENTION

1. Field of the Invention

This invention relates generally to methods and mechanisms for clock timing in a network timing.

2. Description of Related Art

Synchronous optical networking (SONET), is a method for communicating digital information using lasers or light-emitting diodes (LEDs) over optical fiber. SONET technology was developed to replace the Plesiochronous Digital Hierarchy (PDH) system for transporting large amounts of telephone and data traffic and to allow for interoperability between equipment from different vendors. SONET is widely used today in the U.S. and Canada.

Time-Division Multiplexing (TDM) is a type of (typically) digital multiplexing in which two or more signals or bit streams are transferred apparently simultaneously as sub-channels in one communication channel, but physically are taking turns on the channel. The time domain is divided into several recurrent timeslots of fixed length, one for each sub-channel. One TDM frame consists of one timeslot per sub-channel. After the last sub-channel the cycle starts all over again with a new frame, starting with the second sample, byte or data block from the first sub-channel. TDM is used in the differential method of SONET clocking.

SONET differs from PDH in that the exact rates that are used to transport the data are tightly synchronized across the entire network, made possible by atomic clocks. This synchronization system allows entire inter-country networks to operate synchronously, greatly reducing the amount of buffering required between elements in the network. Thus, any improvement in the mechanisms and methods for clock synchronization in a SONET system is desirable.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation which may be apparent to those skilled in the art. Accordingly, the present invention resides in the novel methods, arrangements, combinations and improvements herein shown and described in various exemplary embodiments.

SUMMARY OF THE INVENTION

In light of the present need for dynamic frequency adjustment for interoperability of differential clock recovery methods, a brief summary of various exemplary embodiments is presented. Some simplifications and omission may be made in the following summary, which is intended to highlight and introduce some aspects of the various exemplary embodiments, but not to limit its scope. Detailed descriptions of a preferred exemplary embodiment adequate to allow those of ordinary skill in the art to make and use the invention concepts will follow in later sections.

Differential clock recovery is a mechanism used in circuit emulation to recover a synchronous optical networking (SONET) clock from an Ethernet network. In differential clock recovery, the recovered clock has a better timing characteristic than other approaches. For example, the jitter and wander of a recovered clock is better than with an adaptive clock recovery mechanism.

To achieve the improved timing characteristics of recovered clocks, various exemplary embodiments of the differential approach access a common frequency reference clock at both ends of an Ethernet network. Accordingly, in various exemplary embodiments, the frequency recovered is the SONET service frequency.

In various exemplary embodiments, the differential method involves a master on one side of the Ethernet network and a slave on the other side of the Ethernet network. The master takes its timing from the incoming time division multiplexing (TDM) stream and uses the frequency reference clock to generate a time stamp. The slave receives the time stamps from the master through the Ethernet network and combines the time stamps with the frequency reference clock to recover the TDM service clock.

However, it is believed to be necessary that differential clocks be locked on both the master and the slave. It is also believed to be necessary that the differential clocks run at the same frequency.

The existing standard for circuit emulation, G.8261, does not address the problems described above. Rather, the existing circuit emulation standard has no restrictions regarding the frequency that is used. Further, each entity implementing such a system is free to use any frequency that best suits a particular implementation.

Accordingly, in order to overcome the deficiencies described above, and in order to interoperate with a plurality of products, various exemplary embodiments support multiple frequencies. Accordingly, in various exemplary embodiments, a differential master is deployed in a network such that the differential master is attached to many differential slaves through an Ethernet network operating at different frequencies. Accordingly, in various exemplary embodiments, different frequencies coexist simultaneously on a given differential master line card.

Often, in circuit emulation technology, reference is made to a single frequency reference clock when referring to the differential method of clock recovery. In such references, the frequency reference clock is available on both ends of the Ethernet network. However, such systems do not solve the problem with interoperability. Likewise, such systems do not enable multiple slaves requiring different frequencies to operate simultaneously. Various exemplary embodiments overcome these problems as described below.

A Field-Programmable Gate Array (FPGA) is a semiconductor device containing programmable logic components called "logic blocks", and programmable interconnects. Logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memories.

Various exemplary embodiments use FPGAs as a flexible way to generate different frequencies as described herein. Thus, various exemplary embodiments resolve the interoperability problems described above using FPGAs.

A phase-lock, or phase-locked, loop (PLL) is an electronic feedback system that generates a signal, the phase of which is locked to the phase of an input or "reference" signal. This is accomplished in a common negative feedback configuration by comparing the output of a voltage controlled oscillator to the input reference signal using a phase detector. The phase detector output is then used to drive the phase of the oscillator towards that of the input reference signal.

Various exemplary embodiments employ a single integrated circuit to provide a complete PLL building block. This is believed to be preferable when the desired frequency is close to the reference frequency in the system.

In various exemplary embodiments, a reference frequency is shared between both a master and a slave. In various exemplary embodiments, this reference frequency is used to generate the plurality of other frequencies. In various exemplary embodiments, a user is able to configure the required frequency by accessing the plurality of other frequencies generated from the reference frequency shared between both the master and the slave.

In various exemplary embodiments, this is accomplished using a software interface set in an FPGA. In various exemplary embodiments, the FPGA uses dividers and remainder counters to generate frequencies further apart from the reference frequency. In various exemplary embodiments, this is implemented so as to minimize jitter and wander.

In various exemplary embodiments, the plurality of frequencies generated are distributed throughout the FPGA to different differential clock recovery units. Accordingly, various exemplary embodiments simultaneously support multiple slaves operating at different frequencies. Accordingly, the subject matter described herein is flexible such that it can accommodate a variety of configurations desired by a plurality of different users.

BRIEF DESCRIPTION OF THE DRAWINGS

In order to better understand various exemplary embodiments, reference is made to the accompanying drawings, wherein.

DETAILED DESCRIPTION OF THE PREFERRED EMBODIMENTS OF THE INVENTION

Figure 1:
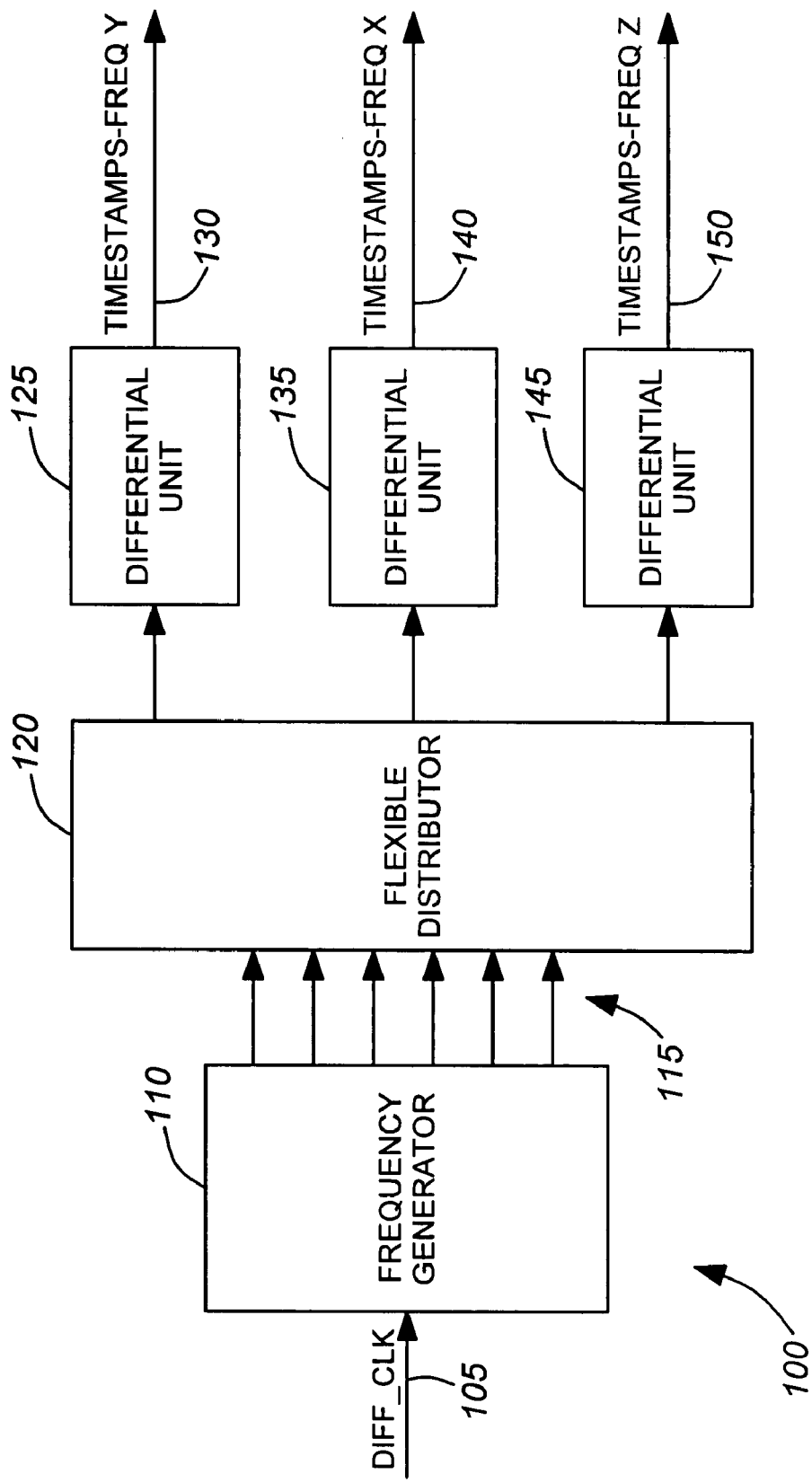
FIG. 1 is a schematic diagram of an exemplary system for dynamic frequency adjustment for interoperability of differential clock recovery methods.

Referring now to the drawings, in which like numerals refer to like components or steps, there are disclosed broad aspects of various exemplary embodiments.

FIG. 1 is a schematic diagram of an exemplary system 100 for dynamic frequency adjustment for interoperability of differential clock recovery methods. Exemplary system 100 includes a common frequency reference clock 105 labeled as diff clk, frequency generator 110, a flexible distributor 120, and a plurality of outputs 115 passing from the frequency generator 110 to the flexible distributor 120. System 100 further includes differential unit 125, differential unit 135, differential unit 145, unlabeled outputs from the flexible distributor 120 to each of the differential units 125, 135, 145, output 130 from differential unit 125 that is time stamps-freq Y, output 140 from differential unit 135 that is time stamps-freq X, and output 150 from differential unit 145 that is time stamps-freq Z.

Details regarding the frequency generator 110 and the plurality of outputs 115 from the frequency generator 110 will be discussed in greater detail below in connection with FIG. 2. The common frequency reference clock 105 is used as a reference to build the plurality of other frequencies. In the process, it is recommended that attention be paid to jitter and wander of the clock.

In various exemplary embodiments, a divider and a remainder value are used to generate other frequencies. In various exemplary embodiments both the divider and the remainder value consists of 32 bits. The frequency generator 110 uses the reference clock 105 to increment a counter. In various exemplary embodiments, when the counter reaches a divider value, a clock edge is generated. Each of the plurality of outputs 115 represents such a generated clock edge.

It should be understood that, in various exemplary embodiments or implementations, some frequencies cannot be obtained by division of the reference clock 105 in the frequency generator 110. Further, it should be understood that many applications have requirements limiting the amount of wander that can occur. Accordingly, in many applications it is believed to be unsuitable to merely approximate a desired frequency.

Accordingly, the remainder value is implemented to generate, on average, a more exact frequency that operates within, and thus satisfies, any wander requirement of a given implementation or application. This will be described in greater detail below.

In various exemplary embodiments, the reference clock 105 is common to both a master and a slave. In various exemplary embodiments, the source of the reference clock is selected from a standard such as GPS, 1588 v2, SyncE, and so on. Accordingly, in various exemplary embodiments, the reference frequency 105 is 1.544 MHz, 77.76 MHz or 155.52 MHz. In some applications, a reference frequency 105 of 155.52 MHz is believed to be desirable.

In embodiments where the reference frequency is 77.76 MHz, it is believed to be desirable to use dedicated resources wherein PLL performs the configuration. This is true because, in applications where the reference frequency 105 is 77.76 MHz, dedicated resources are able to lock inside the device. In embodiments where the reference frequency 105 is 1.544 MHz, it is believed to be desirable to implement logic components because dedicated resources might not lock inside the device.

In various exemplary embodiments, a user selects the reference frequency 105 from a plurality of options. In various exemplary embodiments, the plurality of options are listed on a table for the user to select. In addition to the examples given above, in various exemplary embodiments a reference frequency of 103.68 MHz is also available for the user to select. In various exemplary embodiments, the frequency generator 110 generates the frequencies most often used in circuit emulation applications.

It should be apparent that, in various exemplary embodiments, the frequencies generated by the frequency generator 110 are able to be dynamically altered by a user. It should also be apparent that the number of frequencies generated by the frequency generator can be any number other than the six outputs 115 depicted in connection with exemplary system 100.

In various exemplary embodiments, the flexible distributor 120 is a multiplexer. In various exemplary embodiments, the flexible distributor 120 includes selector configuration logic. Accordingly, in various exemplary embodiments, the flexible distributor 120 is able to connect any frequency output 115 from the frequency generator 110 to any of differential units 125, 135, 145. It should be apparent that, this flexibility afforded by the flexible distributor 120 is desirable in order to customize any given implementation to the widest possible range of applications and uses. The outputs 130, 140, 150 will be described in greater detail below in connection with FIG. 2.

Figure 2:
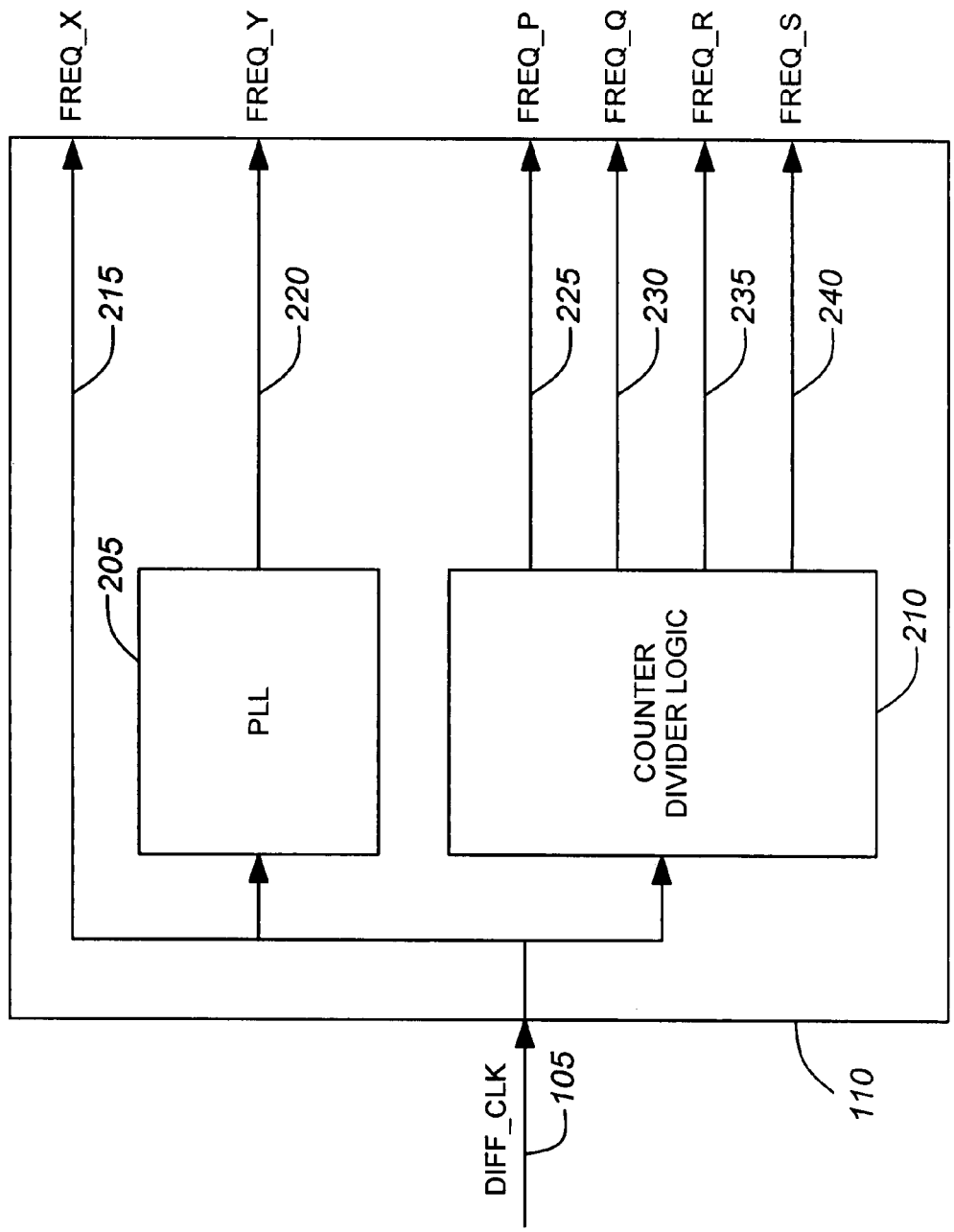
FIG. 2 is a schematic diagram of an exemplary frequency generator for use in the exemplary system for dynamic frequency adjustment for interoperability of differential clock recovery methods, according to FIG. 1.

FIG. 2 is a schematic diagram of an exemplary frequency generator 110 for use in the exemplary system 100 for dynamic frequency adjustment for interoperability of differential clock recovery methods, according to FIG. 1. The frequency generator 110 includes PLL 205, counter divider logic 210 and output 215 labeled as freq_x, output 220 labeled as freq_y, output 225 labeled as freq_p, output 230 labeled as freq_q, output 235 labeled as freq_r, and output 240 labeled as freq_s. The outputs 215-240 correspond to outputs 115. These outputs go to the flexible distributor 120.

Some aspects of the relationship between outputs 215-240 and outputs 115 are as follows. Output 215 from the frequency generator 110 is selected by flexible distributor 120 and passed to differential unit 135. Output 215 is then operated on by the differential unit 135 to generate time stamps-freq X output 140.

Similarly, output 220 is selected by flexible distributor 120 to be passed to differential unit 125. Output 220 is then operated on by differential unit 125 to generate time stamps-freq Y output 130. Although the embodiment of frequency generator 110 depicted in FIG. 2 does not include an output labeled as freq_Z, it should be understood that the output selected by flexible distributor 120 to be passed to differential unit 145 and operated upon by differential unit 145 to generate time stamps-freq Z output 150 is another output from PLL 205 in various exemplary embodiments.

As depicted, output 215 corresponds to reference frequency 105 being merely passed through the frequency generator 110 without change. It should be apparent that output 215 is beneficial for applications where the reference frequency 105 is actually the exact frequency desired for a given use.

Output 220 passes from PLL 205. In various exemplary embodiments, the PLL provides a means to generate clock frequencies that are sufficiently close to the reference frequency 105 and within the PLL specifications. It should be apparent that, in various exemplary embodiments, a plurality of PLLs are included within the frequency generator 110 in order to provide a greater variability of clock frequencies that can be output depending on the availability of PLL resources within a given FPGA.

The counter divider logic 210 provides a means to generate clock frequencies that are further away from the reference frequency 105 such that the frequencies cannot be derived from the PLL 205. Also, in the event that resources of the PLL 205 are unavailable, in various exemplary embodiments the counter divider logic 210 is used to provide divider ratios that can be achieved given the value of the reference frequency 105. Likewise, in various exemplary embodiments, the counter divider logic 210 ensures that an average duty cycle of 50% is maintained.

As introduced above, in various exemplary embodiments, the frequency generator 110 is implemented using logical flip-flops. In various exemplary embodiments, logic components are implemented in the frequency generator 110 either as a supplement to, or as a replacement for, the PLL 205. Accordingly, it should be apparent that, straight division is used in various applications involving the use of a clock.

More specifically, taking an example of a high frequency clock where the clock pulse stays high for 300 cycles and then stays low for 300 cycles. It should be understood that, the clock may wander to where it stays high for 301 cycles and then stays low for 299 cycles. In various exemplary embodiments an averaging feature averages such a clock to be high for 300 cycles and low for 300 cycles.

It should also be apparent that such a smoothing function is available from PLL 205. Further, it should be apparent that nearly any low frequency can be generated over a period of time.

Figure 3:
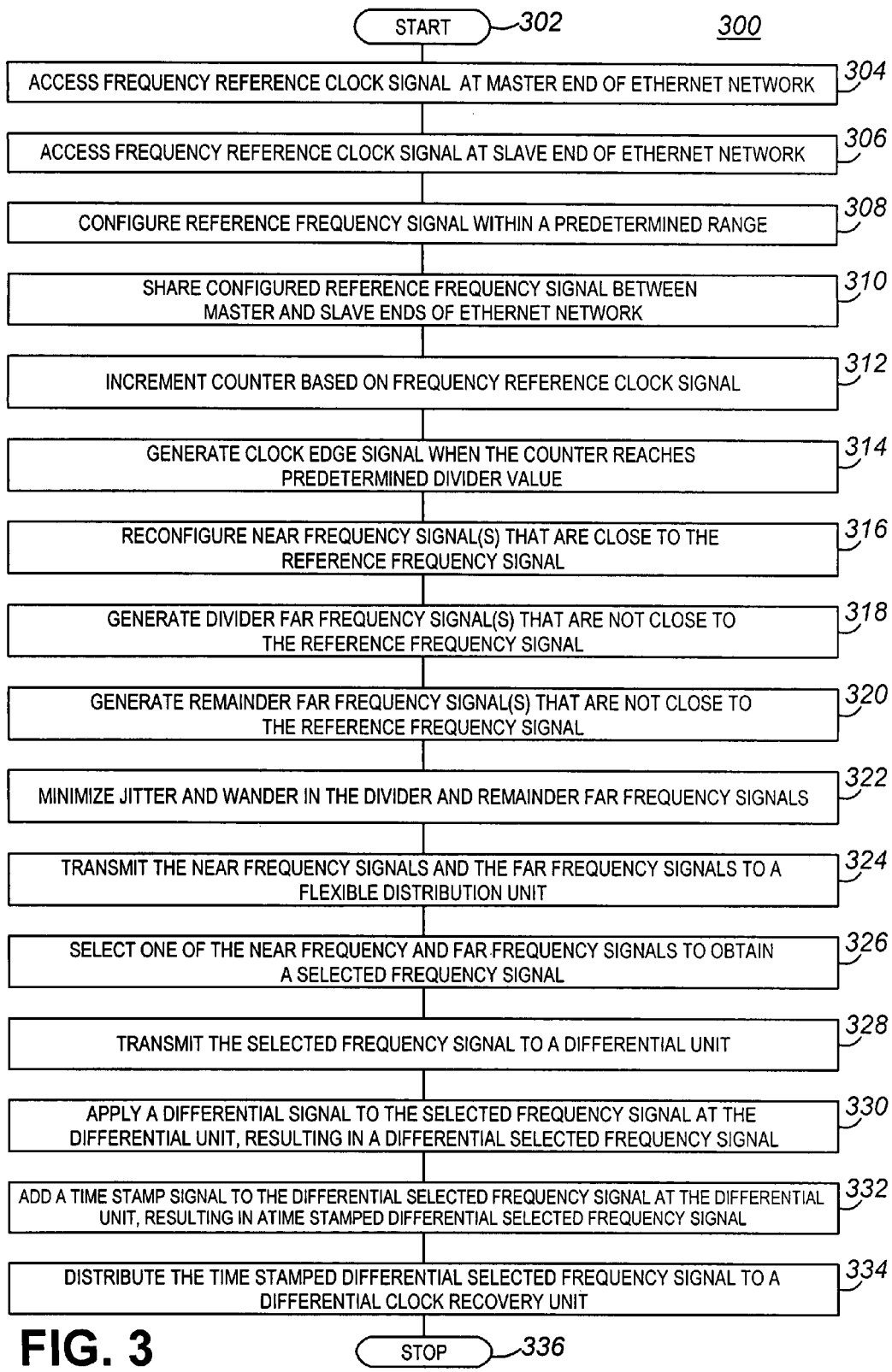
FIG. 3 is a flow chart of an exemplary method for dynamic frequency adjustment for interoperability of differential clock recovery.

FIG. 3 is a flow chart of an exemplary method 300 for dynamic frequency adjustment for interoperability of differential clock recovery. Method 300 starts in step 302 and continues to step 304.

In step 304, a frequency reference clock signal such as reference signal 105 is accessed at the master end of an Ethernet network. Next, in step 306, the frequency reference clock signal 105 is accessed at a slave end of an Ethernet network.

Following step 306, the method 300 proceeds to step 308. In step 308, a reference frequency signal is configured within a predetermined range based on the reference frequency clock signal 105. Next, the reference frequency signal configured in step 308 is shared between the master and slave ends of the Ethernet network.

Following step 310, the method 300 proceeds to step 312. In step 312, a counter is implemented based on the frequency reference clock signal 105. Next, in step 314, a clock edge signal is generated when a counter reaches a predetermined divider value. Then, in step 316, one or more near frequency signals that are close to the reference frequency signal are reconfigured. Step 316 is performed using PLL 205 in the FPGA 110 in various exemplary embodiments.

Following step 316, the method 300 proceeds to step 318. In step 318, one or more far frequency signals that are not close to the reference frequency signal are generated. In various exemplary embodiments, the divider far frequency signals have a frequency that is a simple multiple of a frequency of the reference frequency signal. Step 318 is performed by counter divider logic 210 in various exemplary embodiments.

Following step 318, the method 300 proceeds to step 320. In step 320, one or more remainder far frequency signals that are not close to the reference frequency signal are generated. In various exemplary embodiments, the remainder far frequency signals have a frequency that is not a simple multiple of the frequency of the reference frequency signal. In various exemplary embodiments, the remainder far frequency signals are generated using one or more dividers and one or more remainder counters that provide one or more remainder value signals.

Following step 320, the method 300 proceeds to step 322. In step 322, jitter and wander are minimized for the divider and remainder far frequency signals. In various exemplary embodiments, a known relationship is calculated between the period of the reference frequency and the period of the target far frequency. Likewise, in various exemplary embodiments, a ratio is then determined between the number of minimum reference periods and maximum reference periods necessary in a calculated time window in order to minimize jitter and wander of the divider and remainder far frequency signals.

Following step 322, the method 300 proceeds to step 324. In step 324, the one or more near frequency signals and the one or more far frequency signals are transmitted to a flexible distribution unit such as flexible distributor 120. Next, one of the near frequency and far frequency signals are selected by flexible distributor 120 to obtain a selected frequency signal.

Following step 326, the method 300 proceeds to step 328. In step 328, the selected frequency signal is transmitted to a differential unit such as differential units 125, 135, 145. Then, in step 330, a differential signal is applied to the selected frequency signal at the differential unit 125, 135, 145. In various exemplary embodiments, this results in a differential selected frequency signal.

Following step 330, the method 300 proceeds to step 332. In step 332, a time stamp is added to the differential frequency signal at the differential unit 125, 135, 145. This results in a time stamped differential selected frequency signal such as outputs 130, 140, 150.

Following step 332, the method 300 proceeds to step 334. In step 334, the time stamped differential selected frequency signal 130, 140, 150 is distributed to a differential clock recovery unit. Then, in step 336, the method 300 stops.

It should be apparent that the foregoing subject matter is applicable to all differential circuit emulation solutions. The subject matter described herein is able to support multiple implementations of the differential methods in a vital way in circuit emulation solutions, regardless of the installed base. The ability to facilitate interoperability between applications enabled by the subject matter described herein is believed to be very beneficial.

Accordingly, the subject matter described herein includes a means to generate multiple frequencies from a reference clock with low jitter and wander, a means to instantiate multiple differential clock recovery units to support multiple slaves, and a flexible means to distribute various frequencies to various differential units. It should be apparent that, accordingly, the subject matter described herein would typically result in a significant opportunity to save costs for users of this subject matter. Otherwise, a master differential is typically restricted to access slaves using a single frequency.

In applications where a plurality of frequencies are desired, a user typically otherwise needs to purchase different masters. Accordingly, for alternative solutions to the subject matter described herein, it is believed to be necessary to pay not only for additional master line cards, but also for burning additional slots in a system for the additional master line cards.

Although the various exemplary embodiments have been described in detail with particular reference to certain exemplary aspects thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A system for dynamic frequency adjustment for interoperability of differential clock recovery, the system comprising:
   a frequency generator for receiving a frequency reference clock signal from two opposing ends of an Ethernet network and generating a plurality of frequency signals by operating on the frequency reference clock signal, the plurality of generated frequency signals being output from the frequency generator and each having a different frequency;
   a flexible distributor for receiving the plurality of generated frequency signals from the frequency generator, selecting ones of said plurality of generated frequency signals, and transmitting said selected frequency signals; and
   a plurality of differential units, each for receiving one of said selected frequency signals, applying a differential signal to said selected frequency signals, adding time stamps to the differential frequency signals, and outputting respective time stamped frequency signals.

2. The system for dynamic frequency adjustment for interoperability of differential clock recovery, according to claim 1, wherein the frequency reference clock signal is a synchronous optical networking clock.

3. The system for dynamic frequency adjustment for interoperability of differential clock recovery, according to claim 1, wherein a recovered frequency of the frequency reference clock signal is a synchronous optical networking service frequency.

4. The system for dynamic frequency adjustment for interoperability of differential clock recovery, according to claim 1, wherein one end of the Ethernet network is a master and an opposite end of the Ethernet network is a slave.

5. The system for dynamic frequency adjustment for interoperability of differential clock recovery, according to claim 4, wherein the master has a timing and takes the timing from an incoming time division multiplexing stream.

6. The system for dynamic frequency adjustment for interoperability of differential clock recovery, according to claim 5, wherein the master uses the frequency reference clock signal to generate a time stamp and the slave receives the time stamp from the master through the Ethernet network, and the slave combines the received time stamp with the frequency reference clock signal to recover a time division multiplexing service clock.

7. The system for dynamic frequency adjustment for interoperability of differential clock recovery, according to claim 1, wherein a differential master is attached to a plurality of differential slaves through the Ethernet network operating at a plurality of different frequencies simultaneously that coexist on a differential master line card.

8. The system for dynamic frequency adjustment for interoperability of differential clock recovery, according to claim 1, wherein the frequency generator is a Field-Programmable Gate Array (FPGA) including a semiconductor device containing programmable logic components and programmable interconnects.

9. The system for dynamic frequency adjustment for interoperability of differential clock recovery, according to claim 8, wherein the FPGA includes memory.

10. The system for dynamic frequency adjustment for interoperability of differential clock recovery, according to claim 1, wherein the frequency generator includes at least one phase-lock loop (PLL), each PLL generating at least one of the plurality of frequency output signals.

11. The system for dynamic frequency adjustment for interoperability of differential clock recovery, according to claim 10, wherein each PLL is a single integrated circuit.

12. The system for dynamic frequency adjustment for interoperability of differential clock recovery, according to claim 10, wherein a user is able to configure the different frequencies of the plurality of frequency signal outputs.

13. The system for dynamic frequency adjustment for interoperability of differential clock recovery, according to claim 12, wherein the user is able to configure the different frequencies of the plurality of frequency signal outputs by using a software interface set in a Field-Programmable Gate Array.

14. The system for dynamic frequency adjustment for interoperability of differential clock recovery, according to claim 10, further comprising:
   a counter divider logic that includes a Field-Programmable Gate Array having a plurality of dividers and a plurality of remainder counters, the counter divider logic generating the plurality of frequency signal outputs.

15. The system for dynamic frequency adjustment for interoperability of differential clock recovery, according to claim 1, wherein the frequency generator uses the frequency reference clock signal to increment a counter.

16. The system for dynamic frequency adjustment for interoperability of differential clock recovery, according to claim 15, wherein the frequency generator generates a clock edge when the counter reaches a predetermined divider value.

17. The system for dynamic frequency adjustment for interoperability of differential clock recovery, according to claim 16, wherein each of the plurality of frequency signal outputs represents one of said generated clock edges.

18. A method of dynamic frequency adjustment for interoperability of differential clock recovery systems, comprising:
   accessing a frequency reference clock signal at a master end of an Ethernet network;
   accessing the frequency reference clock signal at a slave end of the Ethernet network;
   configuring a reference frequency signal within a predetermined range;
   sharing the configured reference frequency signal between the master and slave ends of the Ethernet network;
   incrementing a counter based on the frequency reference clock signal;
   generating a clock edge signal when the counter reaches a predetermined divider value;
   reconfiguring one or more near frequency signals that are close to the reference frequency signal;
   generating one or more divider far frequency signals that are not close to the reference frequency signal;
   generating one or more remainder far frequency signals that are not close to the reference frequency signal;
   transmitting the one or more near frequency signals and the one or more divider and remainder far frequency signals to a flexible distribution unit;
   selecting one of the one or more near frequency signals, the one or more divider far frequency signals, and the remainder far frequency signals to obtain a selected frequency signal at the flexible distribution unit;
   transmitting the selected frequency signal from the flexible distribution unit to a differential unit;
   applying a differential signal to the selected frequency signal at the differential unit;
   outputting a resulting differential selected frequency signal from the differential unit;
   adding a time stamp signal to the differential selected frequency signal at the differential unit, resulting in a time stamped differential selected frequency signal; and
   distributing the time stamped differential selected frequency signal to a differential clock recovery unit.

19. The method of dynamic frequency adjustment for interoperability of differential clock recovery systems, according to claim 18, further comprising:
   minimizing jitter and wander in the one or more divider far frequency signals and the one or more remainder far frequency signals.

20. The method of dynamic frequency adjustment for interoperability of differential clock recovery systems, according to claim 18, wherein the one or more divider far frequency signals have a frequency that is a simple multiple of a frequency of the reference frequency signal.

21. The method of dynamic frequency adjustment for interoperability of differential clock recovery systems, according to claim 18, wherein the one or more remainder far frequency signals have a frequency that is not a simple multiple of a frequency of the reference frequency signal.

22. The method of dynamic frequency adjustment for interoperability of differential clock recovery systems, according to claim 18, wherein the one or more remainder far frequency signals are generated using one or more dividers and one or more remainder counters.

\* \* \* \* \*